US010041517B2

(12) United States Patent
Schaake

(10) Patent No.: US 10,041,517 B2
(45) Date of Patent: Aug. 7, 2018

(54) FASTENER ELEMENT

(71) Applicant: AKTIEBOLAGET SKF, Göteborg (SE)

(72) Inventor: Richard Schaake, Utrecht (NL)

(73) Assignee: AKTIEBOLAGET SKF, Gothenburg (SE)

(*) Notice: Subject to any disclaimer, the term of this patent is extended or adjusted under 35 U.S.C. 154(b) by 196 days.

(21) Appl. No.: 14/763,270

(22) PCT Filed: Jan. 24, 2013

(86) PCT No.: PCT/EP2013/051356
§ 371 (c)(1),
(2) Date: Jul. 24, 2015

(87) PCT Pub. No.: WO2014/114340
PCT Pub. Date: Jul. 31, 2014

(65) Prior Publication Data
US 2016/0003272 A1    Jan. 7, 2016

(51) Int. Cl.
*E04B 1/26* (2006.01)
*F16B 5/00* (2006.01)
(Continued)

(52) U.S. Cl.
CPC .......... *F16B 5/0012* (2013.01); *B29C 70/222* (2013.01); *F16B 5/0614* (2013.01); *B29L 2016/00* (2013.01)

(58) Field of Classification Search
CPC .. B29C 70/222; B29L 2016/00; F16B 5/0012; Y10T 24/44017; Y10T 403/7045; Y10T 403/7047
(Continued)

(56) References Cited

U.S. PATENT DOCUMENTS 4,090,734 A * 5/1978 Inami ................. B60J 5/0437
296/146.6
4,948,196 A * 8/1990 Baba .................. B60J 5/0447
296/146.6
(Continued)

FOREIGN PATENT DOCUMENTS

DE    19805456 A1    10/1998
WO    2008041019 A1    4/2008

*Primary Examiner* — Amber Anderson
*Assistant Examiner* — Nahid Amiri
(74) *Attorney, Agent, or Firm* — Bryan Peckjian; SKF USA Inc. Patent Dept.

(57) ABSTRACT

A fastener element for transmitting a load to a machine part. One of the fastener's longitudinal extension axial ends is fixed with the machine part. The load acts onto the fastener at the other longitudinal extension axial end in a load area. The fastener comprises a plurality of longitudinally extending base parts, including the load area. The base parts are connected to each other by corrugations. To reduce shear in the fastener, a height of the corrugations is substantially constant along a first extension in a fastener longitudinal direction, extending from the machine part to a transition region. The load area is arranged along a second extension in the fastener longitudinal direction adjoining the first extension. Along the second extension, the corrugations height is reduced from the transition region, becoming zero at a final section of the fastener in the axial end region remote from the machine part.

13 Claims, 4 Drawing Sheets

(51) Int. Cl.
*B29C 70/22* (2006.01)
*F16B 5/06* (2006.01)
*B29L 16/00* (2006.01)

(58) Field of Classification Search
USPC .......... 403/363, 364; 24/442, 443, 444, 445, 24/446, 447, 448, 450, 451
See application file for complete search history.

(56) References Cited

U.S. PATENT DOCUMENTS

| | | | | |
|---|---|---|---|---|
| 4,978,562 | A * | 12/1990 | Wycech | B60J 5/0444 264/46.6 |
| 5,324,563 | A | 6/1994 | Rogers et al. | |
| 5,813,718 | A * | 9/1998 | Masuda | B60J 5/0444 296/146.6 |
| 6,241,445 | B1 * | 6/2001 | Godsted | F16B 15/0015 411/464 |
| 7,086,686 | B2 * | 8/2006 | Bullmann | B60J 5/0444 188/377 |
| 7,819,462 | B1 * | 10/2010 | Owens | B29C 70/222 296/146.6 |
| 8,066,922 | B2 * | 11/2011 | Jansen | B29C 70/525 156/180 |
| 8,303,743 | B2 * | 11/2012 | Youn | B32B 27/12 156/163 |
| 2003/0067167 | A1 * | 4/2003 | Massaria | F16L 47/16 285/333 |
| 2007/0202314 | A1 * | 8/2007 | Youn | B32B 27/12 428/297.4 |
| 2010/0266806 | A1 | 10/2010 | Owens | |

* cited by examiner

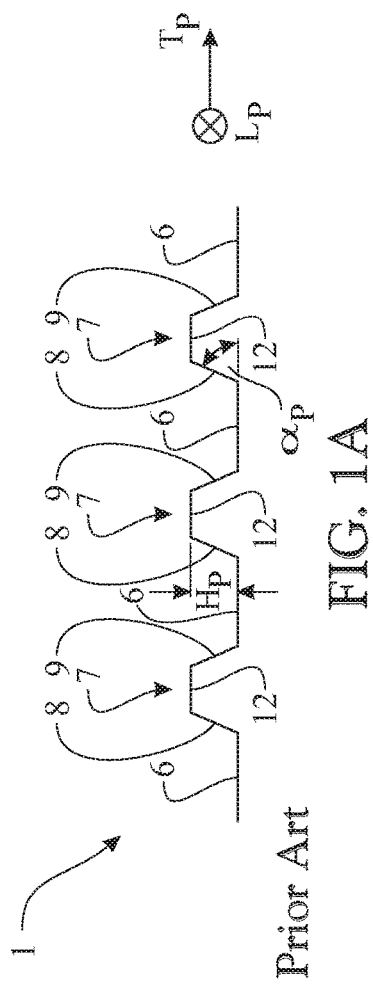
FIG. 1A
Prior Art
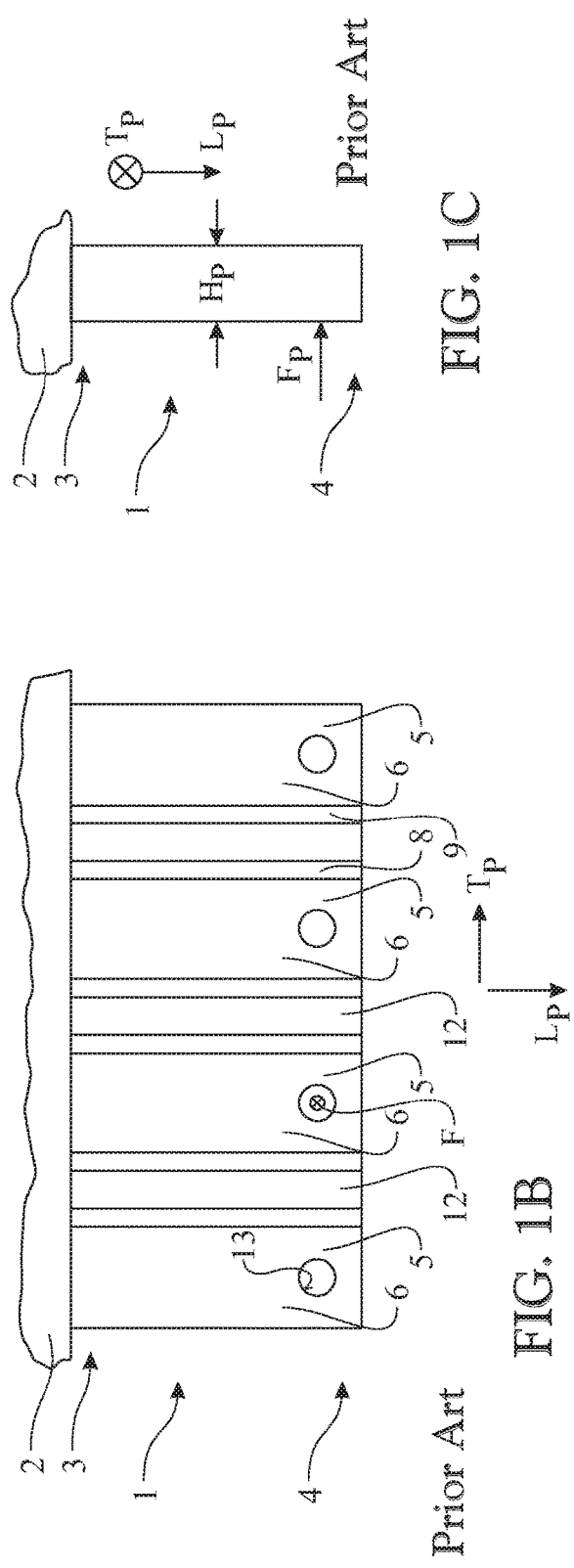
FIG. 1B
Prior Art
FIG. 1C
Prior Art

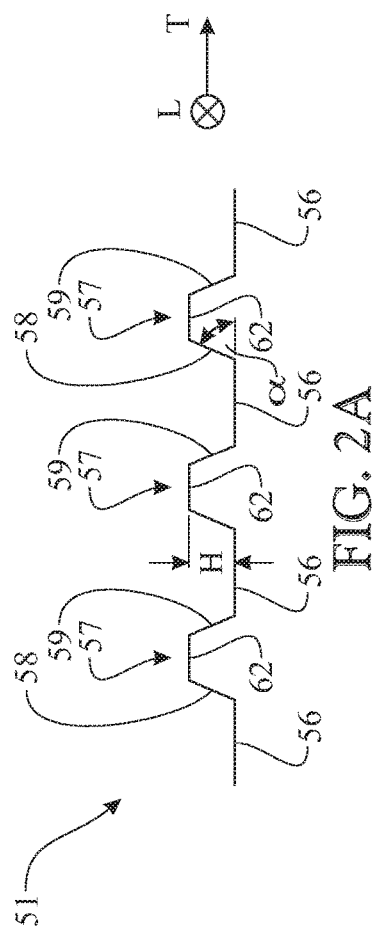
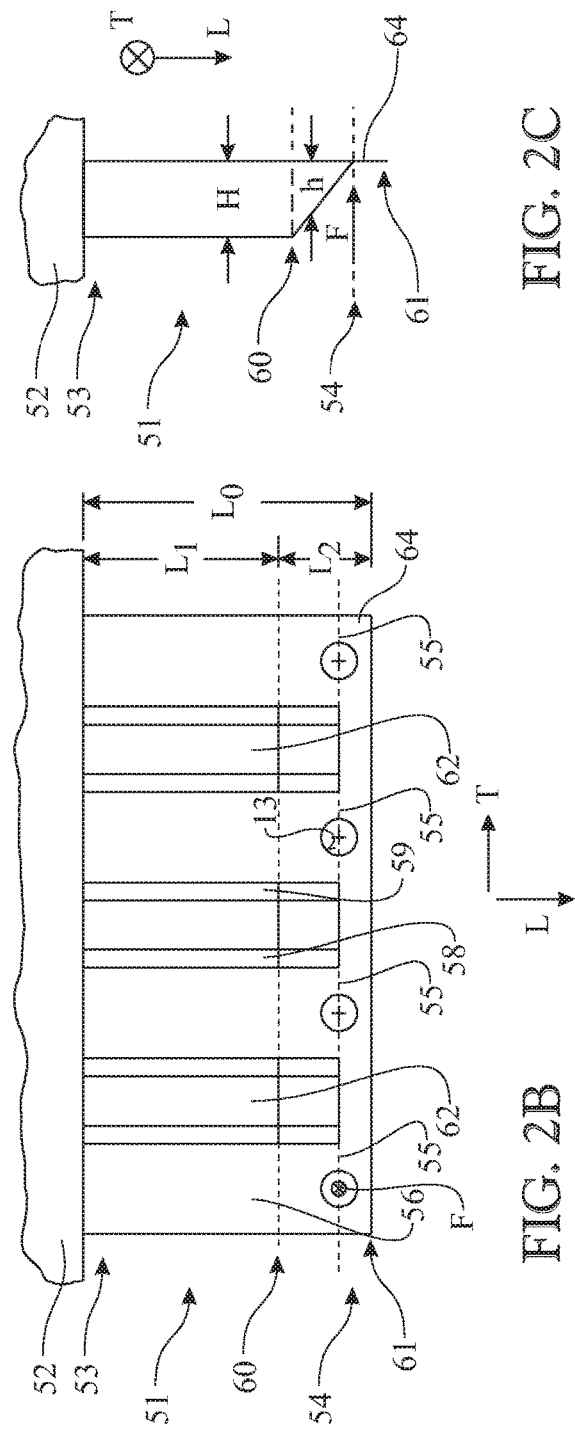
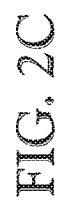

ical field

The invention relates to a fastener element extending in a longitudinal direction and in a transverse direction for transmitting a load to a machine part, wherein the fastener element is fixed at one of its axial end regions of its longitudinal extension with the machine part, wherein the load is acting on the fastener element at the other axial end region of its longitudinal extension in a load area, wherein the fastener element comprises a plurality of base parts extending in the longitudinal direction and having the load area, wherein the base parts are connected to each other by corrugations, wherein each corrugation has two side walls extending under an angle from the base part and having a height. The fastener element is made of a composite material comprising continuous reinforcement fibers that at least partly extend from the machine part to the axial end region remote from the machine part.

FASTENER ELEMENT

CROSS REFERENCE TO RELATED APPLICATIONS

This is a United States National Stage Application claiming the benefit of International Application Number PCT/EP2013/051356 filed on 24 Jan. 2013, which is incorporated herein by reference in its entirety.

TECHNICAL FIELD

The invention relates to a fastener element extending in a longitudinal direction and in a transverse direction for transmitting a load to a machine part, wherein the fastener element is fixed at one of its axial end regions of its longitudinal extension with the machine part, wherein the load is acting on the fastener element at the other axial end region of its longitudinal extension in a load area, wherein the fastener element comprises a plurality of base parts extending in the longitudinal direction and having the load area, wherein the base parts are connected to each other by corrugations, wherein each corrugation has two side walls extending under an angle from the base part and having a height. The fastener element is made of a composite material comprising continuous reinforcement fibers that at least partly extend from the machine part to the axial end region remote from the machine part.

BACKGROUND

Fastener elements are used in many applications to transfer a force acting on the element at a certain distance from the machine part into the same. Due to the fact that the load is acting with distance from the machine part onto the fastener element a bending moment is exerted onto the fastener element. Thus, the fastener element must be able to withstand a certain bending moment without failure to securely transfer the load to the machine part.

One way of increasing bending stiffness is to execute the fastener element with a corrugated structure. When the fastener element is made of a fiber-composite material, however, the bending moment can cause shear between the fibers, which limits the bending stiffness of the fastener element.

It is thus an object of the present invention to propose a fastener element of the kind defined above in which shear forces during load are reduced or even prevented.

SUMMARY OF THE INVENTION

A solution according to the invention is characterized in that the corrugations have a substantially constant height along a first extension in longitudinal direction of the fastener element, which first extension extends from the machine part to a transition region, whereby the load area is arranged along a second extension in longitudinal direction of the fastener element adjoining the first extension. Along the second extension, the height of the corrugations reduces from the transition region to the level of the base part, and becomes zero at a final section of the second extension.

The corrugations consist of two side walls that extend from the base part under an angle, the two side walls being joined by a connection part. Suitably, along the first extension of the fastener element, the connection parts run parallel to the base parts. Along the second extension, the connection parts slope downwards towards the final section, at the level of the base part.

The load area is thus located in a region of the fastener element where the corrugations are connected to the base part via the sidewalls and via the connection part between the sidewalls. Such a cross-section increases resistance to shear.

The above mentioned angle of the side walls lies between 0 and 90 degrees and is selected depending on the ratio of the bending load to shear load for the application in question.

The reduction of the height preferably takes place from the transition region to the final section of the fastener element at least partially, preferably totally, in a linear manner.

The base part, the side walls and the connection part have preferably a planar shape.

The fastener element comprises continuous reinforcement fibers that at least partly extend from the machine part to the axial end region remote from the machine part. Preferably, the continuous fibers extend completely from the machine part to the axial end region remote from the machine part. Due to the reduction in height of the corrugations, the continuous fibers in the corrugations are led down to the final section, which is at the same level as the base parts, where the load is applied. This creates a load path to the machine part which helps to maximize tension in the continuous fibers and minimize shear.

In a preferred embodiment, the load area in each base part is located such that a centerline drawn in transverse direction through each load area (i.e. a load line) coincides with the start of the final section, where the height of the corrugations becomes zero. The load path may thus be optimized. The load area in each base part may also be located within the final section of the fastener element, where the fastener has a flat cross-section.

The load areas in the base part are typically formed by holes for screws, rivets or other connectors In one embodiment, at least a part of the continuous reinforcement fibers in the corrugations run parallel to the base part in longitudinal direction along the first extension of the fastener element. Along the second extension, the continuous reinforcement fibers are arranged to run down from the transition region to the level of the base part at the axial end region remote from the machine part.

In a preferred embodiment, at least a part of the continuous reinforcement fibers extend from the machine part to the axial end region in a cross-wise manner. In other words, the continuous fibers have a longitudinal direction component and a transverse component, such that a particular fiber may form part of more than one corrugation before reaching the axial end region of the fastener element. The transverse direction component increases the shear stiffness of the corrugations.

The fastener element may be made from of a woven material consisting of the continuous reinforcement fibers. Alternatively, the fastener element may be made from a plastic material or a metallic material in which the continuous reinforcement fibers are embedded.

The continuous reinforcement fibers are preferably carbon fibers, glass fibers or aramid fibers.

In a preferred embodiment, the fastener element is essentially L-shaped and comprises a first leg and a second leg, whereby both the first and second legs are executed with a corrugated structure according to the invention.

A corrugated fastener element according to the invention has a lightweight design and is able to bear relatively high bending moments. Other advantages will become apparent from the detailed description and accompanying figures.

BRIEF DESCRIPTION OF THE DRAWINGS

FIG. 1A shows a front view of prior art of a fastener element;

FIG. 1B shows a top plan view of the prior art of the fastener element introduced in FIG. 1A;

FIG. 1C shows a side view of the prior art of the fastener element introduced in FIG. 1A with a corrugated structure;

FIG. 2A shows a front view of a fastener element;

FIG. 2B shows a top plan view of the fastener element introduced in FIG. 2A;

FIG. 2C shows a side view of a fastener element introduced in FIG. 2A, with a corrugated structure according to the invention;

DETAILED DESCRIPTION OF THE PRESENT INVENTION

Figure 3:
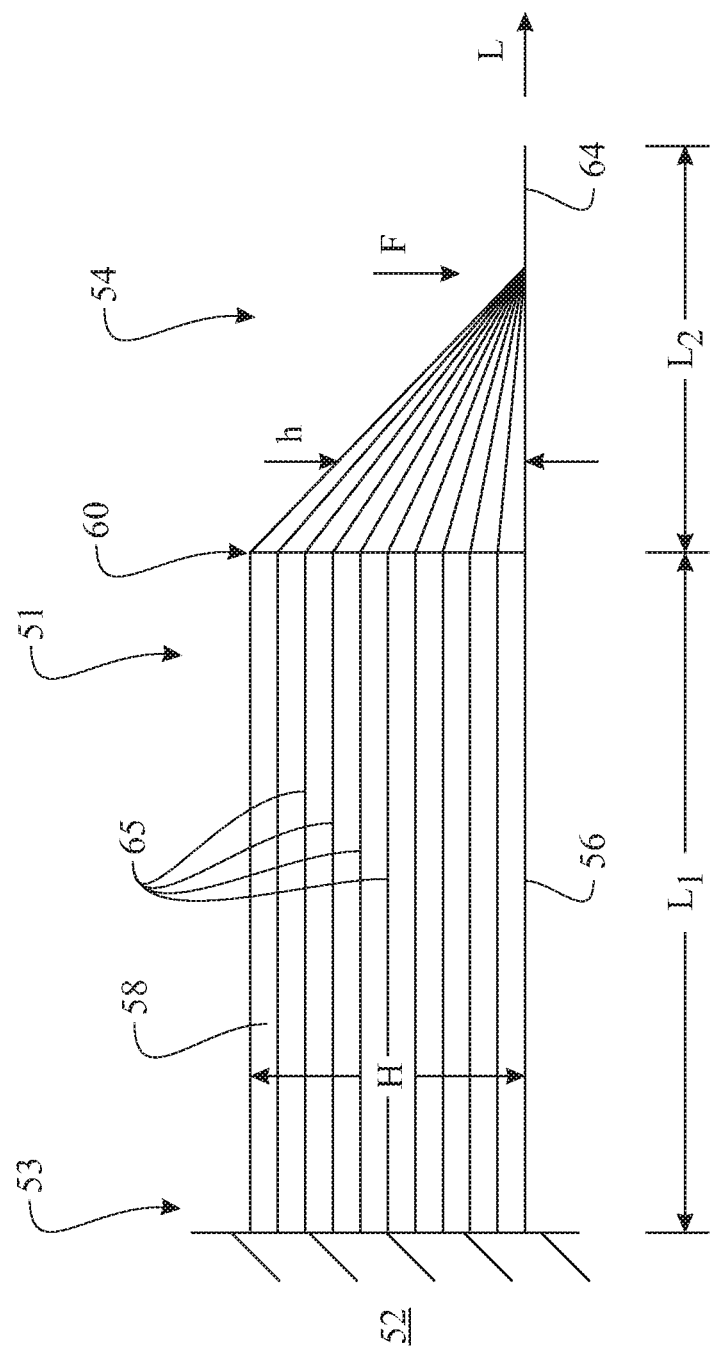
FIG. 3 shows the side view of the fastener of the fastener element introduced in FIG. 2A, wherein the run of continuous reinforcement fibers is illustrated for a first embodiment of the invention.

In FIGS. 1A, 1B and 1C, a known fastener element 1, made from a fiber-reinforced composite material, is shown.

The fastener element 1 extends generally in a longitudinal direction $L_P$ as well as in a transverse direction $T_P$. It allows transmission of a load $F_P$ (force) to a machine part 2. The fastener element is fixed at one of its axial end regions of its longitudinal extension, namely at its end region 3, with the machine part 2. The load $F_P$ is acting on the fastener element 1 at the other axial end region 4 of the longitudinal extension in a load area 5. Furthermore, the fastener element 1 comprises a plurality of base parts 6 extending in the longitudinal direction $L_P$ and having the load area 5; the base parts 6 are connected to each other by corrugations 7. Each corrugation 7 has two side walls 8 and 9 which extend under an angle α from the base part 6. The side walls 8, 9 are joined by a connection part 12. These side walls 8, 9 have a height $H_P$, so that the fastener element 1 forms a corrugated structure in transverse direction $T_P$. For the transfer of the force $F_P$, holes 13 for e.g. screws or other suitable connectors are arranged in the base parts 6.

It is aimed for that the fastener element 1 with its corrugated structure is able to transmit a quite high force $F_P$ from the load area 5 to the machine part 2. Thus, the fastener element 1 must have a high capability to carry bending moments.

The following general remarks should be given:

The normal equation for calculating bending stiffness is to use the Euler-Bernoulli equation to calculate the deflection δ of a beam with length L under a load F as a function of the second moment of area I and the Young's modulus E:

$$\delta = \frac{F \cdot L^3}{3 \cdot E \cdot I}$$

Corrugated sheets have a higher bending stiffness than a flat sheet of the same thickness, due to the increase in the second moment of area. It is therefore necessary to introduce a correction factor φ, given by:

$$\phi = \frac{I}{I_0} = \frac{(h+t)^2}{t^2}$$

where I is the second moment of area of the corrugated sheet, $I_0$ is the second moment of area for the flat cross-section sheet, h is the height of the corrugation and t is the thickness of the sheet.

The Euler-Bernoulli equation assumes that shear is negligible. As a guideline this is possible if $$\frac{E \cdot I}{\kappa \cdot L^2 \cdot A \cdot G} \ll 1$$

Where G is the shear modulus, κ is a shear factor dependent on the poisson ratio and the geometry. A typical range of values for κ is 0.8 to 1 for isotropic materials.

For isotropic material, this condition is met if L>16 h. In corrugated sheets used in construction this is generally the case. However, in compact structures such as fasteners, this is not the case. Furthermore, composite materials are non-isotropic. The interlamellar shear modulus can be many times smaller than the young's modulus in the fiber direction.

For example, while E/G is typically about 3 for isotropic materials, E/G can be in the order of 100 for fiber composite sheets. Consequently, the length to moment of area ratio $I/L_2$ needs to be approximately 30 times bigger than for an isotropic material. The stiffness of corrugated composites used in compact structures (small length/height ratio) is therefore limited by shear.

Thus the following measures are taken to avoid shear forces in the fastener element, i. e. to avoid or at least reduce shear in the fastener element when the load F is applied.

The invention proposes a design, a preferred embodiment of which is shown in FIGS. 2A, 2B and 2C.

The side walls 58, 59 have a substantially constant height H along a first extension $L_1$ in longitudinal direction L of the fastener element 51. The first extension $L_1$ forms part of the total length $L_0$ of the fastener element 51. The first extension $L_1$ extends from the machine part 52 to a transition region 60. The load area 55 is arranged along a second extension $L_2$ in longitudinal direction L, adjoining the first extension $L_1$. According to the invention, the height h of the side walls 58, 59 and of the connection parts 62 (i.e. the height of the corrugations 57) is reduced from the transition region 60 to the level of the base part 56, at the axial end region 54 of the fastener element remote from the machine part 52. A final section 64 is arranged in the axial end region 54, which section 64 is flat and does not comprise any corrugation. The final section 64 begins where the height of the corrugations 57 becomes zero and extends to an axial edge 61 of the fastener element 51.

Thus, in the region of the load areas 55, which are arranged along the second extension $L_2$, the corrugations 57 are connected to the base part 56 not only via the side walls 58, 59, but also via the connection parts 62.

Returning now to FIGS. 1A to 1C, it can be seen that in the known fastener element, the corrugations 7 extend to the axial edge remote from the machine part 2, meaning that the load areas (screw holes 13) are arranged in a region where the corrugations have an open cross-section.

In the region of the load areas, a fastener element according to the invention has a cross-section that is more resistant to shear.

Is should be noted that in FIG. 2A, transitions in transverse direction T between the base parts 56 and the side walls 58, 59 and transitions between the side walls 58, 59 and connection parts 62 have been depicted using straight lines, for ease of drawing. Preferably, the transitions have a curvature with a radius greater than the thickness of the fiber-reinforced material from which the fastener element is made. Similarly, with reference to FIG. 2C, the transitions in longitudinal direction L between the final section 64 and the sections of the corrugations that are reducing in height reducing—height corrugation are preferably have a curvature as described above.

The load areas 55 may be arranged between the transition region 63 and the start of the final section 64. Preferably, as depicted in FIG. 2B, a centerline through the load areas 55 in transverse direction T coincides with the start of the final section 64. The centerline through the load areas may also be located within the final section 64.

The corrugations 57 are made of a composite material which comprises a number of continuous reinforcement fibers 65 extending at least partially from the machine part 52 to the axial end region 54 remote from the machine part 52.

In FIG. 3 an example of the run of reinforcement fibers 65 in a side wall 58, 59 is depicted. In this example, the fibers 65 are continuously running from the axial end region 53 of the side wall 58, 59 to the axial end region 54. The fibers 65 are embedded in the base material of the walls 58, 59 which can be e. g. plastic material.

Along the first extension $L_1$ the fibers are oriented parallel to the longitudinal direction L. In the depicted embodiment, the fibers 65 are evenly distributed along the height H of the side walls 58, 59.

From the transition region 60, the fibers 65 (a segment of fibers 65 identified as fibers 66) run downwards and converge at a location where the height h becomes zero, i.e. at the final section 64. The section of fibers 66 extend in the transverse direction, and are arranged to run down to the level of the base part between one of the axial end regions adjacent to the machine part to the other axial end region. The final section 64 may be free of fibers 65, 66; alternatively, they can run along this part of the fastener element as well.

The continuous fibers 65 therefore converge where the load line in transverse direction T is applied, thereby creating a load path to the machine part 52, which maximizes tension in the continuous fibers and minimizes shear.

Figure 4:
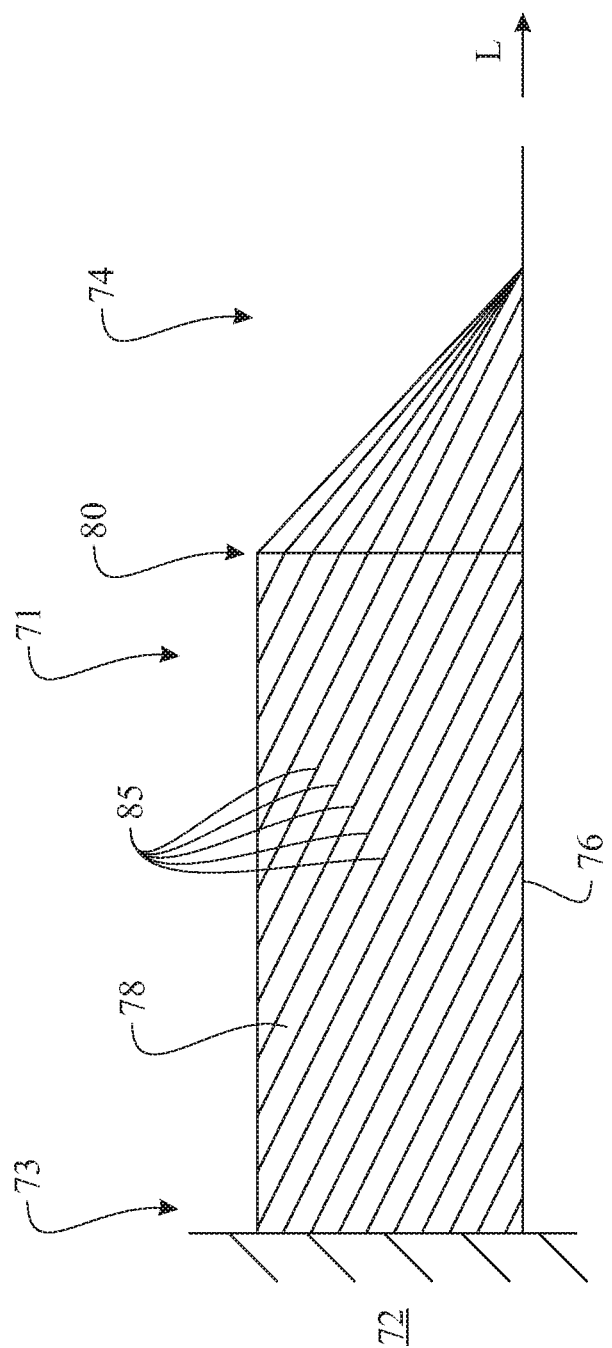
FIG. 4 shows a side view of a variation of the fastener element in the depiction of FIG. 3, a second embodiment of the invention.

In the example shown in FIG. 4, a variation on the run of the reinforcement fibers 85 is shown. A fastener element 71 is a modified variant of the fastener element 51. Like elements of the fastener element 71 and the fastener element 51 are number the same, except the fastener element 51, which has element references preceding with the numerals "5" and "6" are preceded with the numeral "7" and "8" respectively. Here, the fibers 85 not only extend in the longitudinal direction L, but also in the transverse direction T. In other words, the continuous fibers run at an angle across the fastener element 1 from one axial end region 73 to the other axial end region 74. The transverse direction component 86 of the fibers 85 increases the shear stiffness of the corrugations.

After the transition region 80, the fibers in the corrugations 77 run downwards to the base part 76, whereby a number of the fibers converge at the location where the height h of the side walls becomes zero. Again, a load path is created which maximizes tension in the continuous fibers and minimized shear.

A number of aspects/embodiments of the invention have been described. It is to be understood that each aspect/embodiment may be combined with any other aspect/embodiment. Moreover the invention is not restricted to the described embodiments, but may be varied within the scope of the accompanying patent claims.

REFERENCE NUMERALS

1 Fastener element
2 Machine part
3 Axial end region
4 Axial end region
5 Load area
6 Base part
7 Connection section
8 Side wall
9 Side wall
12 Connection part
$L_P$ Longitudinal direction
$T_P$ Transverse direction
$F_P$ Load (force)
$H_P$ Height
$\alpha_P$ Angle
51 Fastener element
52 Machine part
53 Axial end region
54 Axial end region
55 Load area
56 Base part
57 Connection section
58 Side wall
59 Side wall
60 Transition region
61 Axial end
62 Connection part
63 Screw hole
64 Final section
65 Reinforcement fiber
71 Fastener element
72 Machine part
73 Axial end region
74 Axial end region
75 Load area
76 Base part
77 Connection section
78 Side wall
79 Side wall
80 Transition region
81 Axial end
82 Connection part
83 Screw hole
84 Final section
85 Reinforcement fiber
L Longitudinal direction
$L_1$ First extension
$L_2$ Second extension
$L_0$ Total length
T Transverse direction
H Height
h Height F Load (force)
α Angle

The invention claimed is:

1. A fastener element extending in a longitudinal direction and in a transverse direction, the fastener element assembled to a machine part in an arrangement which transmits a load to the machine part, the fastener element being configured to be fixed at one axial end region of a longitudinal extension of the fastener element with the machine part and comprises a load area at a remote axial end region of the longitudinal extension of the fastener element in a load area, the remote axial end region being remote from the machine part, wherein the fastener element comprises a plurality of base parts extending in the longitudinal direction, the longitudinal extension is segmented into a first extension and a second extension,
   wherein adjacent base parts of the plurality of base parts are connected to each other by corrugations,
   wherein the fastener element is made of a composite material comprising continuous reinforcement fibers, the continuous reinforcement fibers are oriented having at least a portion of the continuous reinforcement fibers in a parallel arrangement, orienting extending from the machine part to the remote axial end region,
   wherein the corrugations have a substantially constant height along the first extension in the longitudinal direction of the fastener element, which the first extension extends from the machine part to a transition region, the second extension adjoins the first extension, the second extension extends from the transition region to the remote axial end region,
   wherein the load area comprises a plurality of connection holes, wherein each connection hole is arranged in a section of the plurality of base parts located along the second extension of the fastener element, and
   wherein along the second extension, the corrugations have a height that reduces from the transition region to a level of the portion of each of the plurality of base parts located along the second extension, and becomes zero at a final section of the fastener element in the remote axial end region.

2. The fastener element according to claim 1, wherein the load area is arranged within the second extension of the fastener element, where the final section begins.

3. The fastener element according to claim 1, wherein the load area is arranged between the transition region and a start of the final section of the fastener element.

4. The fastener element according to claim 1, wherein the load area is arranged within the final section.

5. The fastener element according to claim 1, wherein the continuous reinforcement fibers extend completely from the machine part to the remote axial end region remote from the machine part.

6. The fastener element according to claim 1, wherein, along the first extension of the fastener element, the continuous reinforcement fibers are location within the corrugations, the continuous reinforcement fibers run parallel to the plurality of base parts in the longitudinal direction.

7. The fastener element according to claim 6, wherein, along the second extension of the fastener element, the continuous reinforcement fibers in the corrugations are arranged to run down from the transition region to the level of the base part, at the final section.

8. The fastener element according to claim 1, wherein the continuous reinforcement fibers are location within the corrugations, the continuous reinforcement fibers extend in the longitudinal direction and also in the transverse direction, and which are arranged to run down to the level of the base part between the axial end region adjacent to the machine part to the remote axial end region.

9. The fastener element according to claim 1, is made from a woven material consisting of the continuous reinforcement fibers.

10. The fastener element according to claim 1, is made from one of a plastic material or a metallic material wherein the continuous reinforcement fibers are embedded.

11. The fastener element according to claim 1, wherein the continuous reinforcement fibers are one of carbon fibers, glass fibers or aramid fibers.

12. The fastener element according to claim 1, wherein the reduction of the height takes place from the transition region to the remote axial end region of the fastener element at least partially in a linear manner.

13. The fastener element according to claim 1, wherein the reduction of the height takes place from the transition region to the remote axial end region of the fastener element totally in a linear manner.

* * * * *